United States Patent
Maehara et al.

(10) Patent No.: US 6,614,207 B2
(45) Date of Patent: Sep. 2, 2003

(54) VEHICULAR POWER GENERATOR CONTROL APPARATUS HAVING MAXIMUM CONDUCTION RATE LIMITING FUNCTION

(75) Inventors: Fuyuki Maehara, Nagoya (JP); Keiji Takahashi, Kariya (JP); Toshinori Maruyama, Anjo (JP)

(73) Assignee: Denso Corporation, Kariya (JP)

( * ) Notice: Subject to any disclaimer, the term of this patent is extended or adjusted under 35 U.S.C. 154(b) by 119 days.

(21) Appl. No.: 09/964,467

(22) Filed: Sep. 28, 2001

(65) Prior Publication Data

US 2002/0057545 A1 May 16, 2002

(30) Foreign Application Priority Data

Oct. 3, 2000 (JP) ............................. 2000-303582

(51) Int. Cl.$^7$ ........................... H02H 7/06; H02P 11/00; H02P 9/00
(52) U.S. Cl. ............................ 322/28; 322/24; 322/26
(58) Field of Search .......................... 322/22, 24, 26, 322/28

(56) References Cited

U.S. PATENT DOCUMENTS

| | | | | |
|---|---|---|---|---|
| 4,689,545 A | * | 8/1987 | Komurasaki et al. | 322/14 |
| 5,319,299 A | * | 6/1994 | Maehara | 322/28 |
| 5,449,999 A | * | 9/1995 | Edwards | 322/28 |
| 5,497,071 A | * | 3/1996 | Iwatani et al. | 322/28 |
| 6,014,016 A | * | 1/2000 | Maruyama et al. | 322/28 |
| 6,225,790 B1 | * | 5/2001 | Harmon | 322/28 |
| 6,456,048 B2 | * | 9/2002 | Taniguchi et al. | 322/28 |
| 2001/0043055 A1 | * | 11/2001 | Tanaka et al. | 322/28 |

FOREIGN PATENT DOCUMENTS

| | | |
|---|---|---|
| JP | A-6-284597 | 10/1994 |
| JP | A-6-284598 | 10/1994 |

* cited by examiner

*Primary Examiner*—Dang Dinh Le
*Assistant Examiner*—Julio C. Gonzalez
(74) *Attorney, Agent, or Firm*—Posz & Bethards, PLC

(57) ABSTRACT

A vehicular power generator control apparatus includes a switching transistor, a voltage control circuit, a high rotation speed detecting circuit, a leakage detecting circuit and a maximum conduction rate restricting circuit. The leakage detecting circuit detects leakage current flowing to a P-terminal. When the leakage current is detected, a maximum conduction rate set by the maximum conduction rate restricting circuit is changed from a small value at low rotation speeds to a large value. Thereby, field current flowing in a field coil is increased, a large voltage is generated at stator coils and current flows to a rectifying circuit to thereby reduce the leakage current which flows to the P-terminal.

3 Claims, 2 Drawing Sheets

VEHICULAR POWER GENERATOR CONTROL APPARATUS HAVING MAXIMUM CONDUCTION RATE LIMITING FUNCTION

CROSS REFERENCE TO RELATED APPLICATION

This application is based on and incorporates herein by reference Japanese Patent Application No. 2000-303582 filed on Oct. 3, 2000.

BACKGROUND OF THE INVENTION

The present invention relates to a vehicular power generator control apparatus for controlling a power generating state of a power generator by detecting a rotation speed of the power generator.

A vehicular power generator (a.c. generator) is used to charge a battery in running a vehicle and supplies power of ignition of an engine, illumination and other various electric equipment. A power generator control apparatus is connected to the power generator in order to regulate the output voltage of the power generator to be substantially constant even when its load state is changed. Particularly, in recent times, with an increase in electric loads, drive torque of the power generator tends to increase. When the drive torque of the power generator becomes excessively large in idling to rotate the engine, rotation of the engine becomes unstable. Therefore, the power generator control circuit is required to avoid such a situation by controlling the power generating state of the power generator.

For example, it is proposed in JP-A-6-284598 to restrain supply of field current until exceeding a predetermined rotation speed. By detecting a rotation speed of the power generator by monitoring one phase voltage (P-terminal voltage) of a stator coil, the supply of field current is limited. It is also proposed in JP-A-6-284597 to restrict the supply of field current when an engine is rotated at low speeds.

However, when leakage current is generated at inside of the power generator by being exposed to salt water and the leakage current flows to a P-terminal connected with one end of any phase of stator coils, voltage appearing at the P-terminal rises by being biased by an amount of voltage drop determined by the leakage current and input impedance of the P-terminal. Thereafter, although an alternating current component appears in voltage at the end portion of other phases of the stator coil, the P-terminal voltage is fixed to predetermined bias voltage determined by the leakage current. This state continues until voltages of the stator coils of respective phases other than that of the P-terminal becomes equal to or higher than a terminal voltage of a vehicle-mounted battery or equal to or lower than ground voltage and output current is taken out via a rectifying circuit. Therefore, when the leakage current is generated at the inside of the power generator, the power generation start rotation speed is extremely increased in comparison with its design value and accurate power generation control cannot be carried out.

SUMMARY OF THE INVENTION

The invention addresses the above drawbacks and has an object to provide a vehicular power generator control apparatus capable of firmly carrying out power generation control even when leakage current is generated at inside of the power generator.

A vehicular power generator control apparatus according to the present invention is provided with a voltage control circuit, a rotation speed detecting circuit, a leakage detecting circuit and a maximum conduction rate restricting circuit. The voltage control circuit controls output voltage of a power generator by interrupting switching devices connected in series with a field coil of the power generator. The rotation speed detecting circuit is connected to one phase terminal of stator coils of the power generator and detects a rotation speed of the power generator based on voltage appearing at the one phase terminal. The leakage detecting circuit detects that leakage current flows to the one phase terminal. The maximum conduction rate restricting circuit sets a maximum conduction rate prescribing an upper limit value of a conduction rate of switching device to a first rate until the rotation speed of the power generator detected by the rotation speed detecting circuit exceeds a predetermined value and sets the maximum conduction rate to a second rate higher than the first rate when the leakage current is detected by the leakage detecting circuit.

When generation of the leakage current is detected, regardless of the rotation speed of the power generator, by changing the maximum conduction rate from the first rate to the second rate higher than the first rate, current flowing in a field coil is increased, voltage induced in the stator coil is made to rise, output current is taken out via a rectifying circuit. Thus, the leakage current which flows to the one phase terminal can be reduced, and therefore the rotation speed of the power generator can accurately be detected and power generation control can firmly be carried out.

It is preferable that the leakage detecting circuit detects generation of the leakage current when a state in which the voltage appearing at the one phase terminal exceeds a voltage of a predetermined detection threshold used in detecting the rotation speed of the rotation speed detecting circuit, continues for a predetermined time period. The detecting operation by the rotation speed detecting circuit cannot be carried out by applying predetermined bias voltage by the leakage current flowing to the one phase terminal, and therefore the state is determined to indicate as generation of the leakage current. The maximum conduction rate is changed, and thereby the power generator is restored to a state capable of firmly detecting the rotation speed of the power generator.

It is also preferable that a start instruction detecting terminal is provided for receiving a start instruction signal transmitted from an outside apparatus. When the start instruction signal is not inputted to the start instruction detecting terminal, even when the leakage current is detected by the leakage detecting circuit, the maximum conduction rate control circuit stops an operation of setting the maximum conduction rate to the second rate. When the operation start instruction signal is not inputted and power stops generating, in the case in which the leakage current is generated at inside of the power generator for some reason and generation of the leakage current is detected by the leakage detecting circuit, the field current can be prevented from increasing and discharge of the battery can be restrained by stopping to control to change the maximum conduction rate from the first rate to the second rate for increasing field current.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
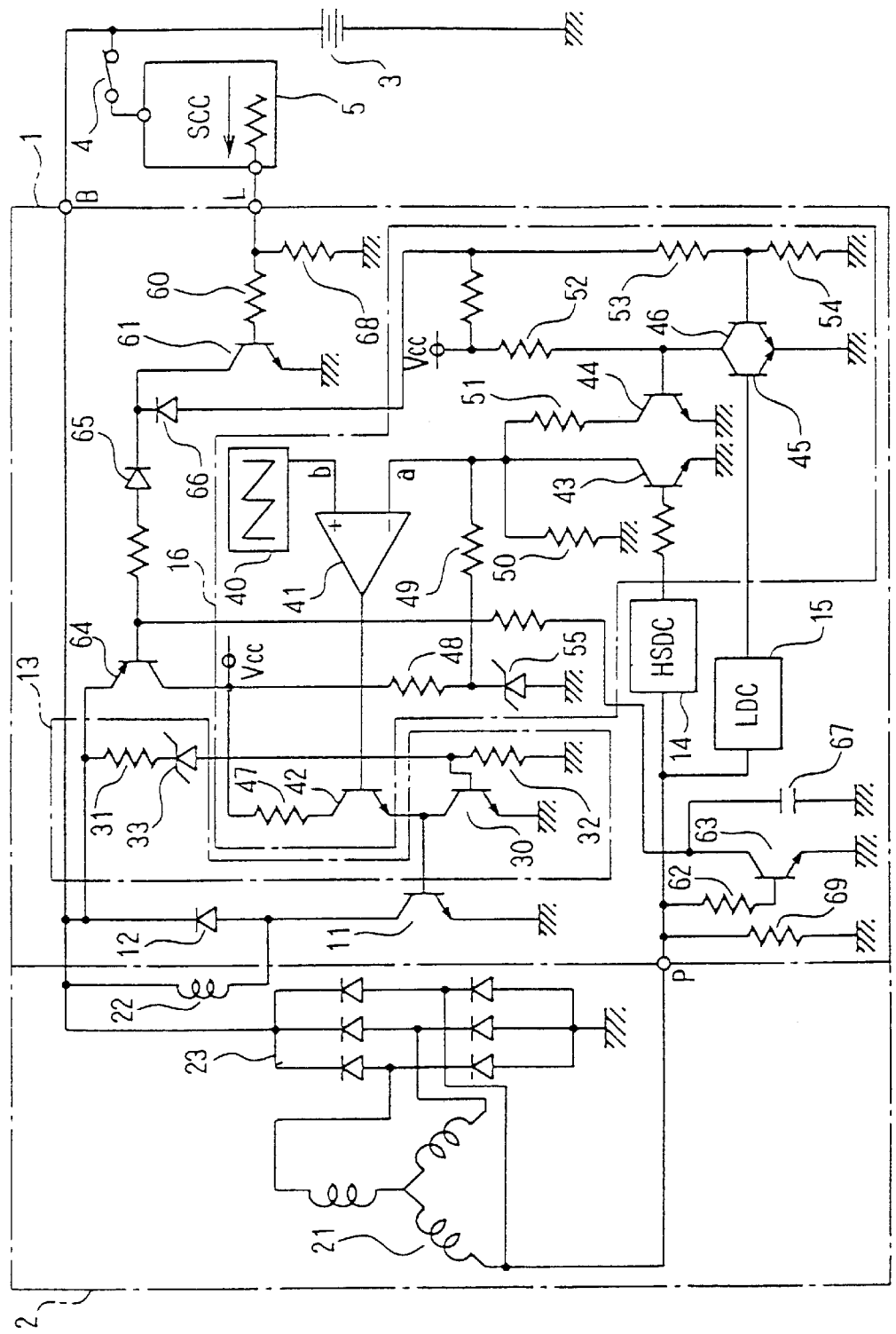
FIG. 1 is a circuit diagram showing a regulator according to an embodiment of the present invention.

Referring to FIG. 1, a regulator 1 is for controlling voltage of an output terminal (B-terminal) of a power generator 2 to a predetermined set value of adjusting voltage (for example, 14 V). A start instruction detecting terminal (L-terminal) is connected to an outside control apparatus 5. When an ignition switch 4 is brought into an ON-state, the control apparatus 5 starts predetermined control operation and inputs a start instruction signal to the L-terminal.

The power generator 2 includes three phases of stator coils 21 included in a stator which is a fixed member, a rectifying circuit 23 provided to subject three phase outputs of the stator coils 21 to full wave rectification and a field coil 22 included in a rotor which is a rotating member. Control of output voltage of the power generator 2 is carried out by pertinently control to make ON/OFF, conduction of electricity to the field coil 22 by the regulator 1. The output terminal (B-terminal) of the power generator 2 is connected to a battery 3 and charge current is supplied from the B-terminal to the battery 3.

As shown in FIG. 1, the regulator 1 includes a transistor 11 as a switching device connected in series with the field coil 22, a flywheel diode 12 connected in parallel with the field coil 22, a voltage control circuit 13 for controlling to turn on and off the transistor 11 such that the output voltage appearing at the B-terminal of the power generator 2 becomes the predetermined set value of adjusting voltage, a high rotation speed detecting circuit 14 for detecting a rotation speed of the power generator 2, a leakage detecting circuit 15 for detecting leakage current of one phase terminal (P-terminal) of the stator coil 21 and a maximum conduction rate restricting circuit 16 for variably setting a maximum conduction rate of the transistor 11.

The voltage control circuit 13 includes a transistor 30, resistors 31 and 32, and a Zener diode 33. The Zener diode 33 has a characteristic to break down when the voltage of the B-terminal of the power generator 2 becomes equal to or higher than the set value of the adjusting voltage. At this occasion, voltage across both ends of the resistor 32 becomes high, the transistor 30 is turned off and potential of the collector becomes low. The collector of the transistor 30 is connected to the base of the transistor 11 and when the potential of the collector of the transistor 30 is lowered, the transistor 11 is turned off and therefore current flowing in the field coil 22 is reduced.

The high rotation speed detecting circuit 14 detects the rotation speed of the power generator 2 based on the one phase voltage appearing at the P-terminal and changes its output from low level to high level when the rotation speed exceeds a predetermined rotation speed.

When the leakage detecting circuit 15 detects generation of the leakage current flowing to the P-terminal, the leakage detecting circuit 15 changes its output from high level to low level.

Figure 2:
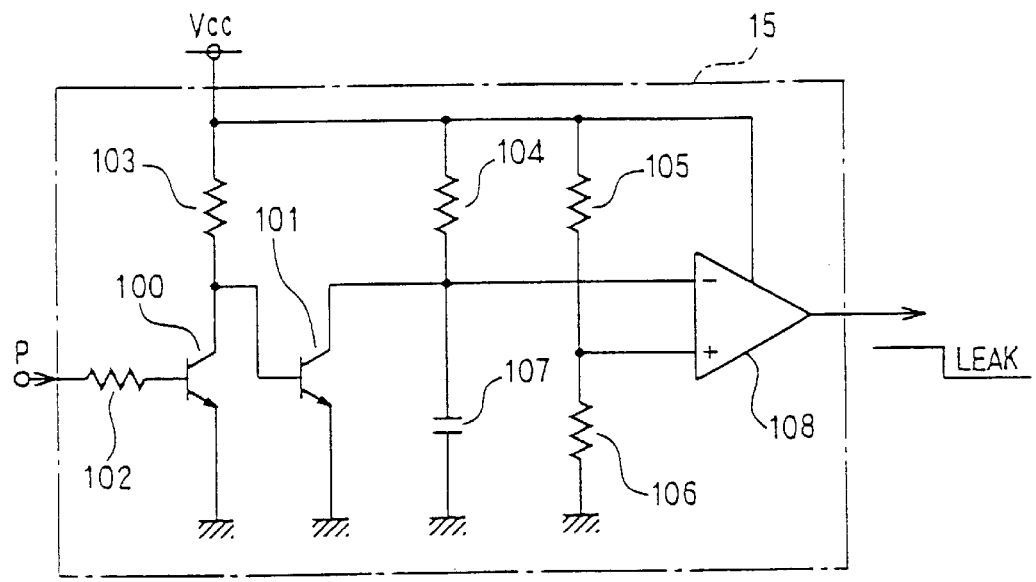
FIG. 2 is a circuit diagram showing a a leakage detecting circuit in the embodiment.

As shown in FIG. 2, the leakage detecting circuit 15 is provided with transistors 100 and 101, resistors 102 through 106, a capacitor 107 and a voltage comparator 108. In a state in which the leakage current does not flow to the P-terminal, the one phase voltage appearing at the P-terminal is applied to the base of the transistor 100 via the resistor 102. Therefore, when the power generator 2 is brought into a power generating state, in synchronism with the period of the one phase voltage, the transistor 100 repeats to turn off. In accordance therewith, the transistor 101 also repeats to turn off. Therefore, the capacitor 107 connected to the collector of the transistor 101 at the post stage repeats to charge and discharge. The voltage across the both ends of the capacitor 107 does not exceed a predetermined voltage value determined by a resistance ratio of the resistors 105 and 106 and high level is maintained in an output of the voltage comparator 108.

Meanwhile, when the leakage current flows and the voltage at the P-terminal rises and exceeds a predetermined voltage value (detection threshold value), the transistor 100 is turned off and the transistor 101 at the following stage is turned off. Therefore, the capacitor 107 is charged. After a predetermined time period, the voltage across the both ends exceeds the predetermined voltage value determined by the resistance ratio of the resistors 105 and 106 and the output of the voltage comparator 108 is changed from high level to low level. The time period, by which the voltage across both ends of the capacitor 107 exceeds the predetermined voltage value, is set to a time period longer than one period of a waveform of voltage induced at the stator coil 21 at a rotation speed sufficiently lower than the rotation speed of the power generator 2 in correspondence with idling rotation of the engine. Thereby, the voltage appearing at the P-terminal by the leakage current and the one phase voltage of the stator coil 21 are differentiated from each other and only generation of the leakage current can be detected by the leakage detecting circuit 15.

Further, the maximum conduction rate restricting circuit 16 is provided with a reference voltage waveform generator 40, a voltage comparator 41, transistors 42 through 46, resistors 47 through 54 and a Zener diode 55. The reference voltage waveform generator 40 generates a triangular voltage waveform as a reference voltage waveform and inputs the waveform to +terminal (point b) of the voltage comparator 41. The voltage comparator 41 generates a maximum conduction ratio setting signal having a different duty ratio by making voltage level applied to −terminal (point a) variable.

FIGS. 3A, 3B, 3C and 3D are timing diagrams showing various input and output waveforms in the maximum conduction ratio restricting circuit 16. From the reference voltage waveform generator 40, there is outputted the reference voltage waveform designated by notation Vb in FIG. 3A, which corresponds to the voltage at point b applied to the + terminal of the voltage comparator 41. Further, the voltage at point a applied to the − terminal of the voltage comparator 41 is determined by the Zener diode 55 and the three resistors 49, 50 and 51.

In a state in which the leakage current is not detected by the leakage detecting circuit 15 (normal state), the output of the leakage detecting circuit 15 becomes high and therefore the transistor 45 is turned off and the transistor 44 is turned off.

Figure 3:
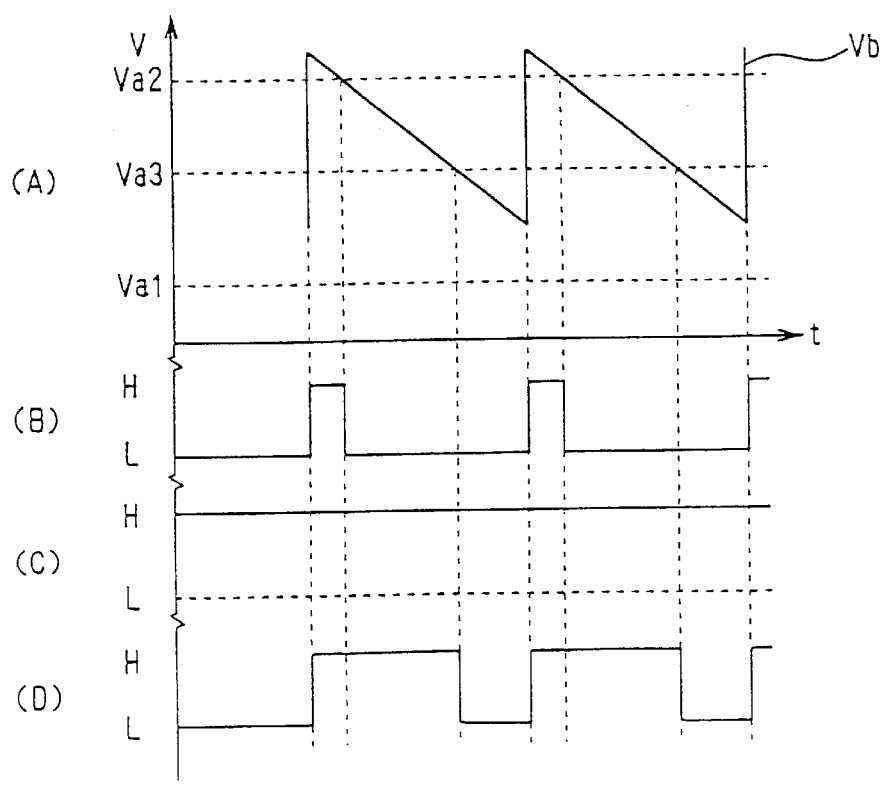
FIGS. 3A, 3B, 3C and 3D are operational timing diagrams showing input and output waveforms of a maximum conduction rate restricting circuit in the embodiment.

In such a normal state, when the rotation speed of the power generator 2 is equal to or lower than the predetermined rotation speed and the output of the high rotation speed detecting circuit 14 is at low level, the transistor 43 is turned off and therefore the voltage at point a is determined by the voltage dividing ratio of the two resistors 49 and 50. In FIG. 3A, the voltage at this occasion is designated by notation Va2 and a waveform shown in FIG. 3B is outputted from the voltage comparator 41.

Further, in the normal state, when the rotation speed of the power generator 2 exceeds the predetermined rotation speed and the output of the high rotation speed detecting circuit 14 is changed from low level to high level, the transistor 43 is turned off and therefore, the − terminal of the voltage comparator 41 is grounded via the transistor 43 and the voltage at point a becomes a value near to 0V. In FIG. 3A, the voltage at this occasion is designated by notation Va1 and a waveform shown in FIG. 3C is outputted from voltage comparator 41.

Further, when generation of the leakage current is detected by the leakage detecting circuit 15, the output of the leakage detecting circuit 15 is changed from high level to low level. The transistor 45 is turned off and the transistor 44 is turned off. Therefore, the voltage at point a is determined by respective resistance values of the three resistors 49, 50 and 51. In FIG. 3A, the voltage at this occasion is designated by notation Va3 and a waveform shown in FIG. 3D is outputted from the voltage comparator 41.

The output terminal of the voltage comparator 41 is connected to the base of the transistor 42. The transistor 42 is turned off in accordance with the waveform outputted from the voltage comparator 41 and restricts the maximum conduction rate of the transistor 11 connected in series with the field coil 22.

Further, as shown in FIG. 1, the L-terminal is connected to the base of a transistor 61 via a resistors 60. When a transistor 63 connected to the transistor 61 or the P-terminal via a resistor 62 is turned off, a transistor 64 is turned off and supply of operational voltage Vcc constituting a power source of the regulator 1 is started. Two diodes 65 and 66 are provided to restrict reverse flow of current. A capacitor 67 is provided for smoothing voltage applied to the base of the transistor 64 when the transistor 63 is turned off intermittently in accordance with the waveform of the one phase voltage of the stator coil 21 inputted to the P-terminal. Two resistors 68 and 69 are provided for preventing erroneous operation to prevent the transistors 61 and 63 from being operated by small leakage current.

According to the embodiment, when the start instruction signal is inputted to the L-terminal, the transistors 61 and 64 are turned on and supply of the operational voltage Vcc constituting the power source of the regulator 1 is started. Thereby, the reference voltage waveform generator 40, the voltage comparator 41, the high rotation speed detecting circuit 14 and the leakage detecting circuit 15 start operating.

(Operation when Leakage Current is not Present)

When the rotation speed of the power generator 2 exceeds the predetermined rotation speed, the output of the high rotation speed detecting circuit 14 becomes high level and therefore the transistor 43 is turned off and the voltage Va1 at the point a becomes always equal to or lower than the voltage Vb at the point b. Therefore, the waveform having the duty ratio of 100% shown in FIG. 3C is outputted from the voltage comparator 41 and the conduction rate of the transistor 11 is controlled in a ranged up to 100% at maximum in accordance with a state of load at that occasion.

Further, when the rotation speed of the power generator 2 is reduced and the output of the high rotation speed detecting circuit 14 becomes low level, the transistor 43 is turned off and therefore the voltage Va2 at point a rises. Therefore, the waveform having the small duty ratio shown in FIG. 3B is outputted from the voltage comparator 41 and a maximum value of the conduction rate of the transistor 11 becomes a small value.

In the state in which the leakage current does not flow to the P-terminal, the high rotation speed detecting circuit 14 can accurately detect the rotation speed of the power generator 2 based on the voltage of the P-terminal. Therefore the maximum conduction rate is restrained to be low at low rotation and is made high at high rotation. Further, even when a state in which the start instruction signal is erroneously outputted from the control apparatus 5 and inputted to the L-terminal in the stationary state of the engine continues, the maximum conduction rate at that occasion is set to a low value. Therefore, discharge of the battery 3 caused by conduction of electricity to the field coil 22 can be minimized.

(Operation when Leakage Current is Present)

When the leakage current flows to the P-terminal and the voltage of the P-terminal rises to exceed the predetermined value, the output of the leakage detecting circuit 15 is changed from high level to low level and the transistor 45 is turned off. At that occasion, the start instruction signal is inputted to the L-terminal. The transistor 61 is turned off and the transistor 46 is turned off. The transistor 44 is turned off and the resistor 51 is connected between point a and the ground. Thus, the voltage Va3 at point a is lowered, the waveform having the large duty ratio shown in FIG. 3D is outputted from the voltage comparator 41 and the maximum value of the conduction rate of the transistor 11 is controlled to a value higher than that when the leakage current is not present. Thereby, the current flowing in the field coil 22 is increased. The voltage induced in the stator coil 21 becomes high. Generated voltage applied to the rectifying circuit 23 becomes equal to or higher than the terminal voltage of the battery 3 or equal to or lower than the ground. Current in the forward direction flows to respective rectifying elements of the rectifying circuit 23. The leakage current flowing to the P-terminal is reduced. The bias voltage becomes low. Thus, normal rotation speed detecting operation by the high rotation speed detecting circuit 14 can be restarted.

Further, in a state in which the start instruction signal is not inputted to the L-terminal, the transistor 63 is turned off with generation of the voltage at the P-terminal, the transistor 64 is also conducted and supply of the power source voltage Vcc of the regulator 1 is carried out. Although at low rotation speeds, the output of the high rotation speed detecting circuit 14 becomes low level and the transistor 43 is turned off, when there is not present the leakage current flowing to the P-terminal at that occasion, the output of the leakage detecting circuit 15 becomes high level. The transistor 45 is turned off and the transistor 44 is turned off. The voltage at point a becomes voltage Va determined by the two resistors 49 and 50 and the maximum conduction rate becomes the small value designated by the duty ratio of the waveform shown in FIG. 3B.

Meanwhile, at high rotation speeds, the output of the high rotation speed detecting circuit 14 becomes high level and the transistor 43 is turned off. Point a is grounded via the transistor 43 and the potential of point a becomes always equal to or lower than the voltage of point b. Therefore, the maximum conduction rate is set to 100% which is the duty ratio of the waveform shown in FIG. 3C.

In this way, according to the embodiment, in the state in which the leakage current does not flow to the P-terminal, at low rotation speeds, the small maximum conduction rate is set and the drive torque of the power generator 2 can be reduced and rotation of the engine in idling can be stabilized. Meanwhile, at high rotation speeds, the maximum conduction rate is changed to 100% and power can be supplied from the power generator 2 to large electric load.

Further, when the leakage current flows to the P-terminal and the voltage of the P-terminal rises, generation of the leakage current is detected by the leakage detecting circuit 15 and the maximum conduction rate is changed to a value higher than a value in correspondence with low rotation in the normal state. Thereby, current in the forward direction can be made to flow to respective rectifying diodes of the rectifying circuit 23 by increasing current flowing in the field coil 22. The leakage current flowing to the P-terminal can be reduced and normal rotation speed detecting operation by the high rotation speed detecting circuit 14 can be carried out. Therefore, even when the leakage current flows to the stator coil 21 under a severe environment of use such as exposing the power generator 2 to salt water, the power generation control based on accurate detection of the rotation speed of the power generator 2 can be carried out. Starting performance of the engine can be promoted and discharge current of the battery can be restrained by restricting unnecessary field current.

The present invention is not limited to the above embodiment but can be modified in many other ways within the range of the gist of the invention. For example, the L-terminal may be omitted. In this case, with rotation of the rotor, voltage is induced in the stator coil 21 by residual magnetic flux. Thus, the power generation control by the regulator 1 can be started by detecting the voltage from the P-terminal.

What is claimed is:

1. A vehicular power generator control apparatus comprising:

a voltage control circuit for controlling an output voltage of a power generator by interrupting a switching device connected in series with a field coil of the power generator;

a rotation speed detecting circuit connected to one phase terminal of a stator coil of the power generator for detecting a rotation speed of the power generator based on a voltage appearing at the one phase terminal;

a leakage detecting circuit for detecting that a leakage current flows to the one phase terminal; and a maximum conduction rate restricting circuit for setting a maximum conduction rate prescribing an upper limit value of a conduction rate of the switching device to a first rate until the rotation speed of the power generator detected by the rotation speed detecting circuit exceeds a predetermined value and setting the maximum conduction rate to a second rate higher than the first rate when the leakage current is detected by the leakage detecting circuit.

2. The vehicular power generator control apparatus according to claim 1, wherein the leakage detecting circuit detects generation of the leakage current when a state in which the voltage appearing at the one phase terminal exceeds a voltage of a predetermined detection threshold used in detecting the rotation speed of the rotation speed detecting circuit, continues for a predetermined time period.

3. The vehicular power generator control apparatus according to claim 1, further comprising:

a start instruction detecting terminal for receiving a start instruction signal transmitted from an outside apparatus, wherein the maximum conduction rate control circuit stops an operation of setting the maximum conduction rate to the second rate even when the leakage current is detected by the leakage detecting circuit, under a condition that the start instruction signal is not inputted to the start instruction detecting terminal.

* * * * *